Oct. 9, 1951 B. R. HALPERN 2,570,668
PRECISION PROCESS CAMERA
Filed Dec. 13, 1947 10 Sheets-Sheet 1
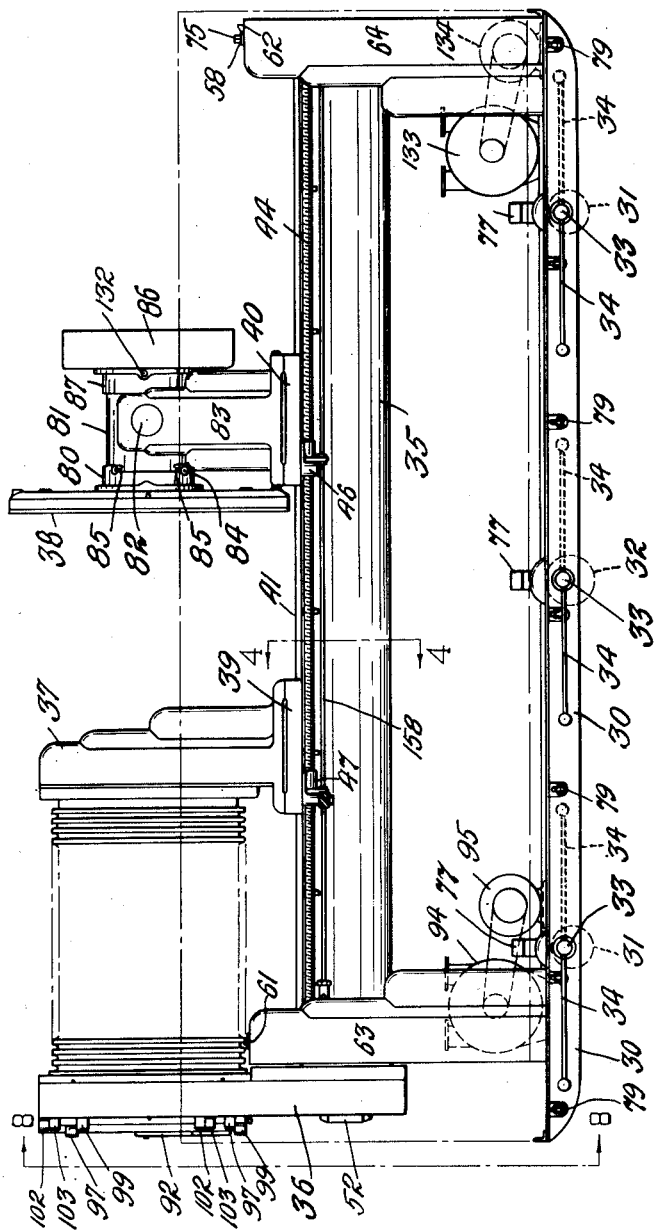
BERNARD R. HALPERN
INVENTOR.
BY
ATTORNEY.

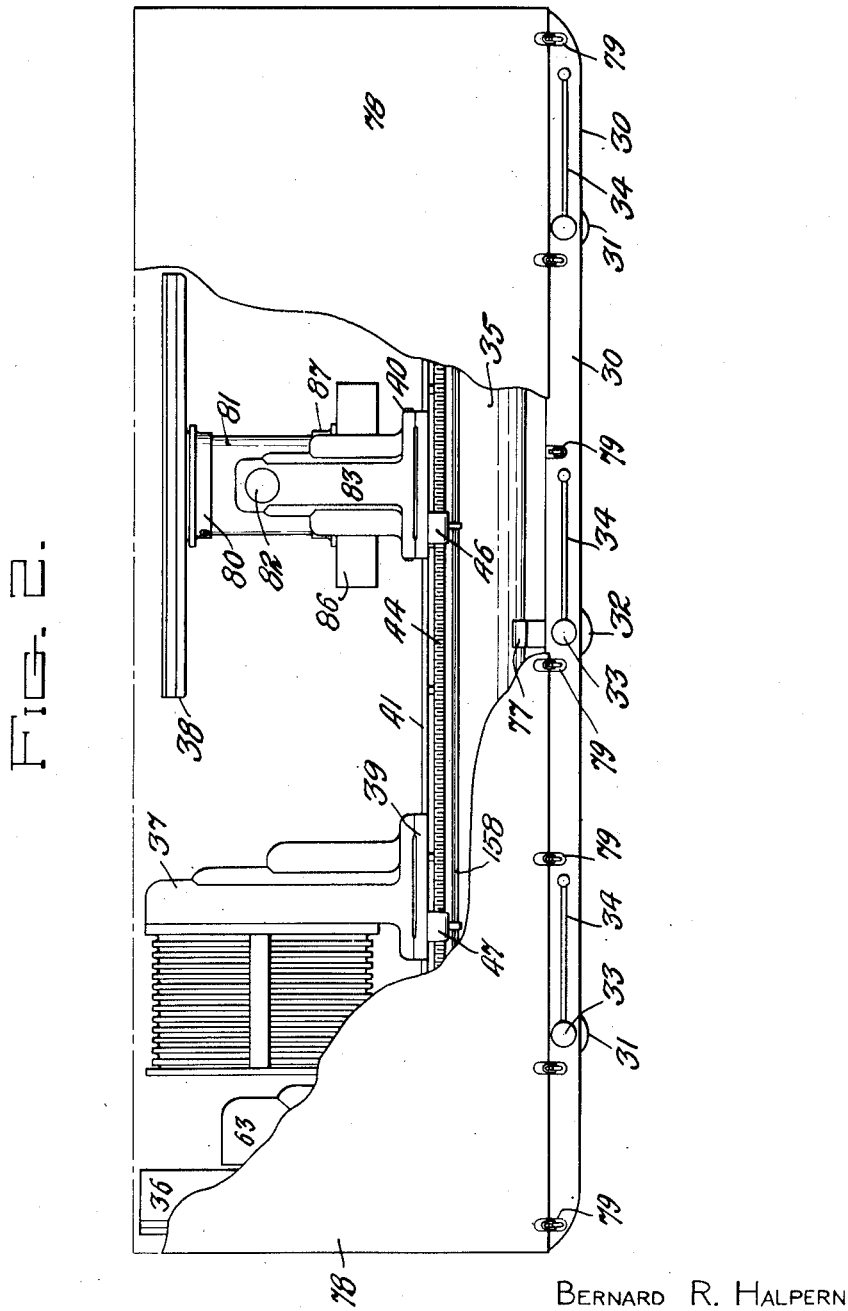

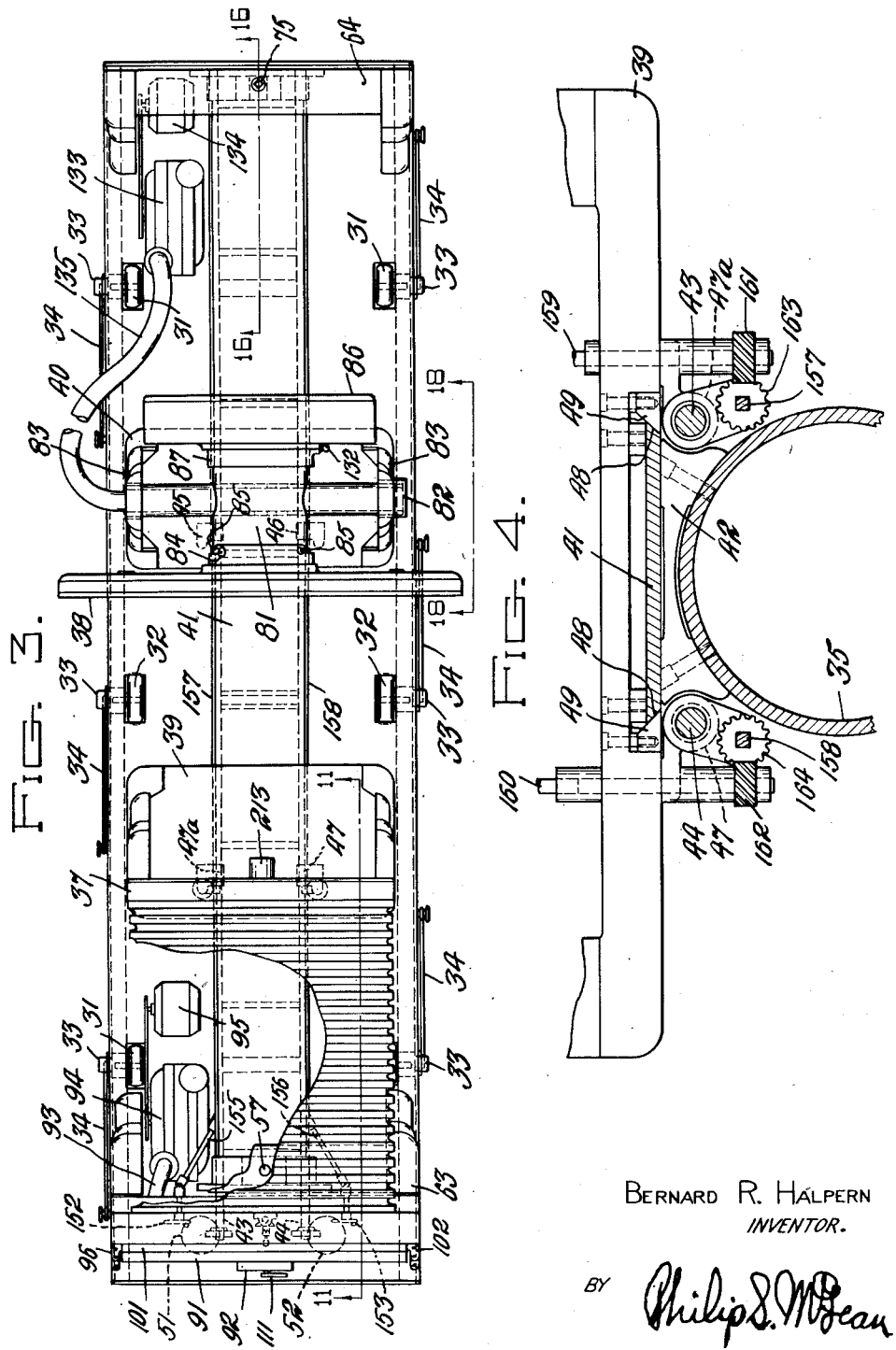
Bernard R. Halpern
INVENTOR.
BY Philip S. McBean.
ATTORNEY.

Oct. 9, 1951 B. R. HALPERN 2,570,668
PRECISION PROCESS CAMERA
Filed Dec. 13, 1947 10 Sheets-Sheet 4
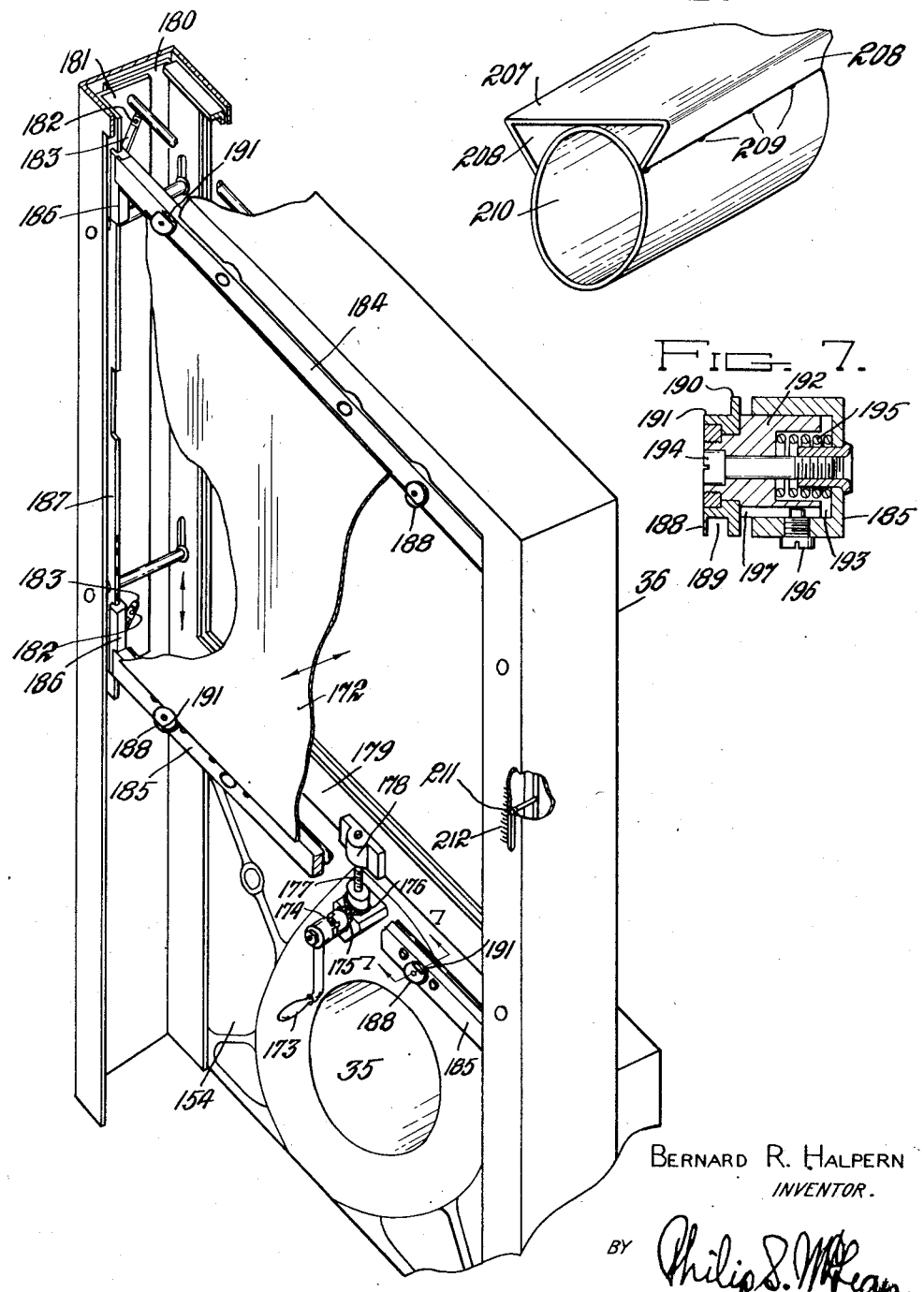
BERNARD R. HALPERN
INVENTOR.
BY Philip S. McLean
ATTORNEY.

Oct. 9, 1951     B. R. HALPERN     2,570,668
PRECISION PROCESS CAMERA
Filed Dec. 13, 1947     10 Sheets-Sheet 5
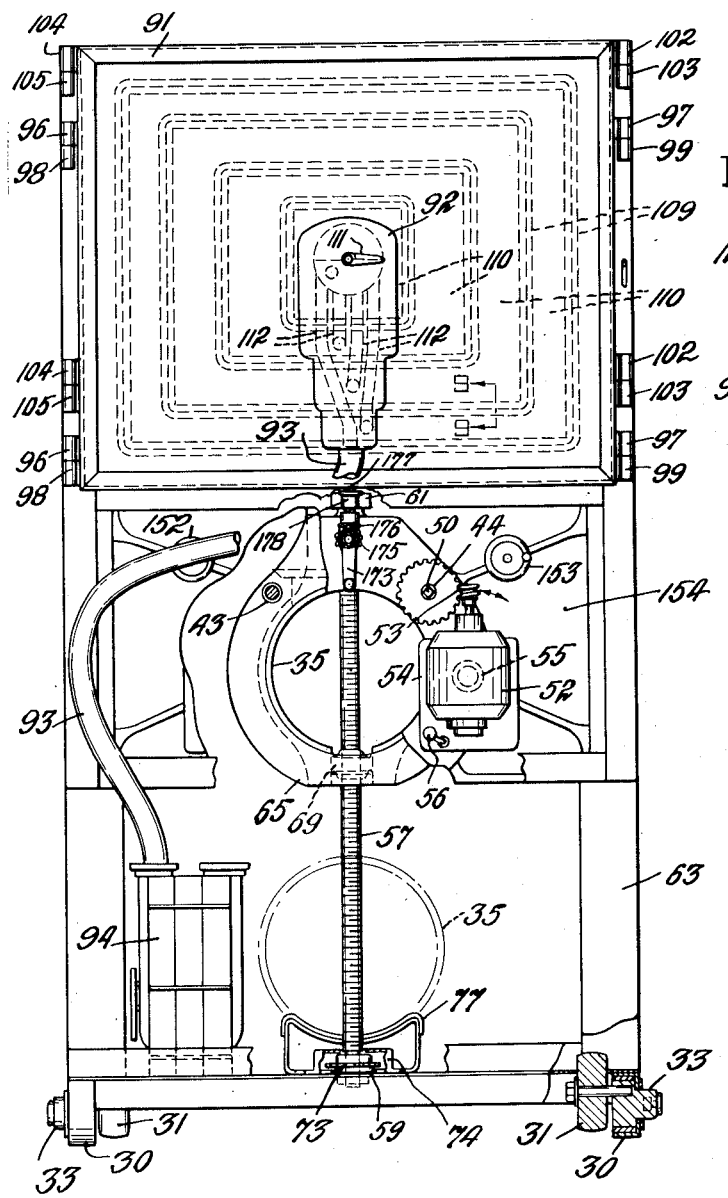
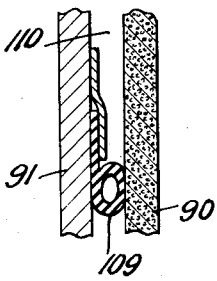
BERNARD R. HALPERN
INVENTOR.
ATTORNEY.

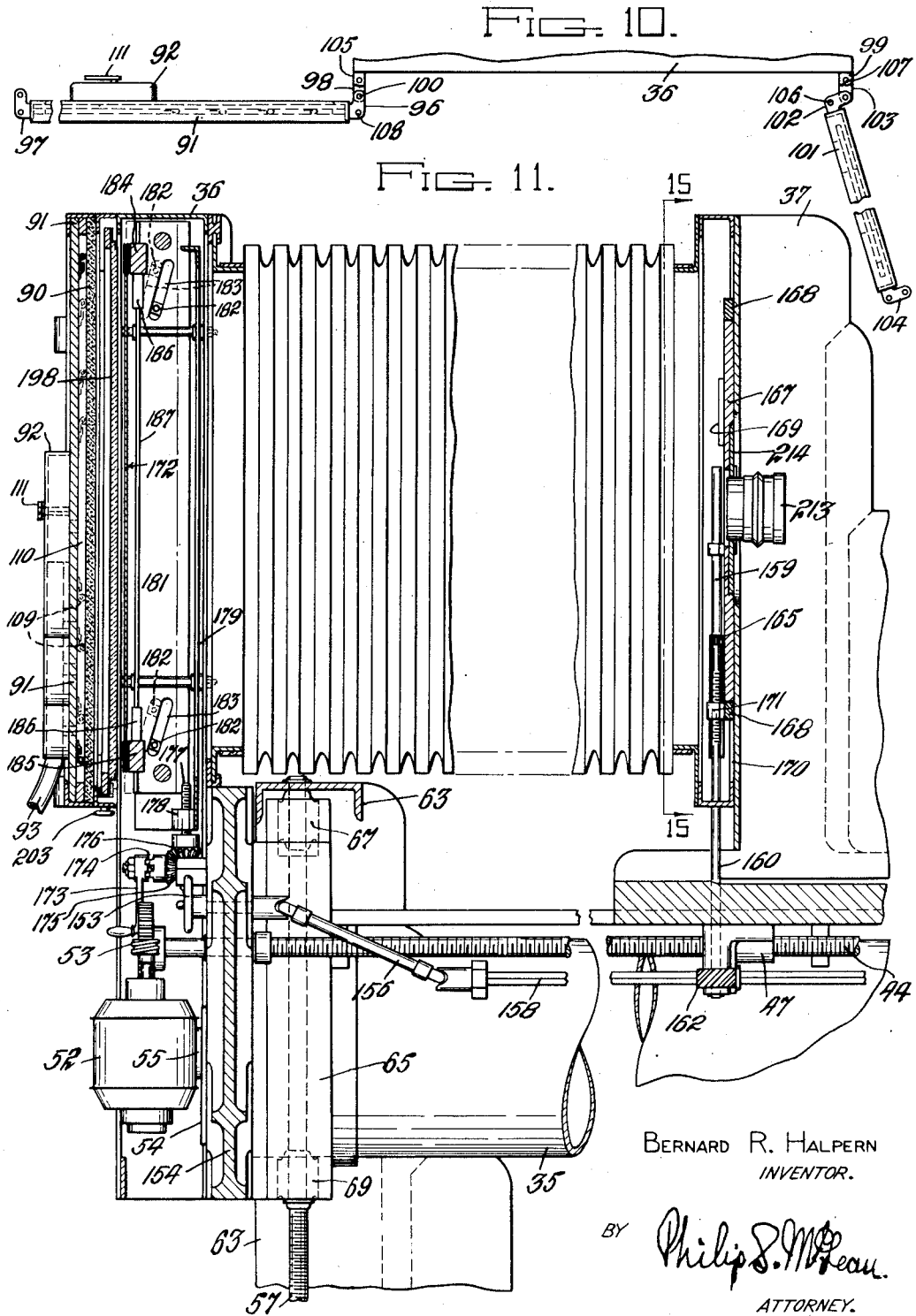

Oct. 9, 1951 B. R. HALPERN 2,570,668
PRECISION PROCESS CAMERA
Filed Dec. 13, 1947 10 Sheets-Sheet 7
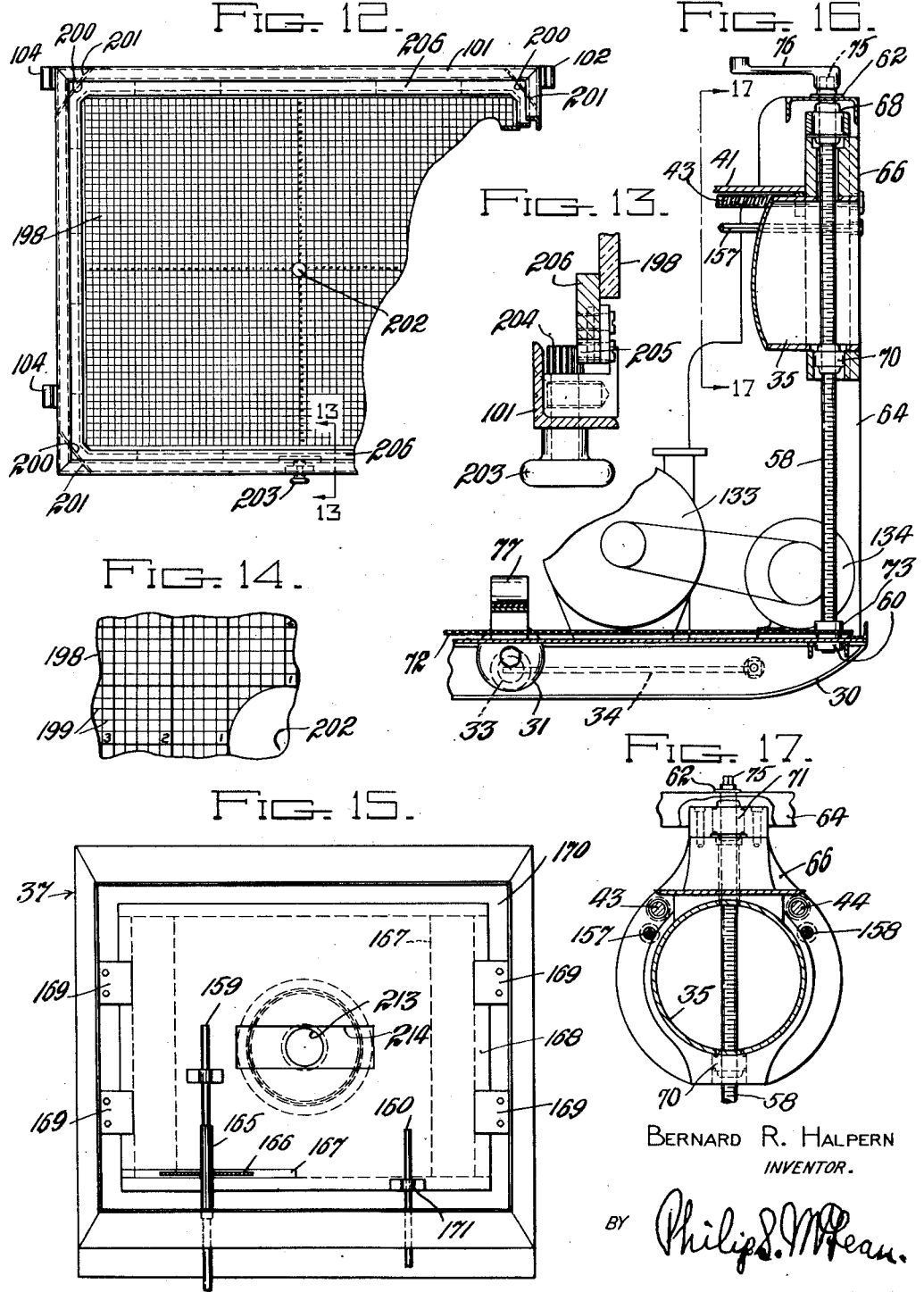

Oct. 9, 1951  B. R. HALPERN  2,570,668
PRECISION PROCESS CAMERA
Filed Dec. 13, 1947  10 Sheets-Sheet 8

BERNARD R. HALPERN
INVENTOR.

BY

ATTORNEY.

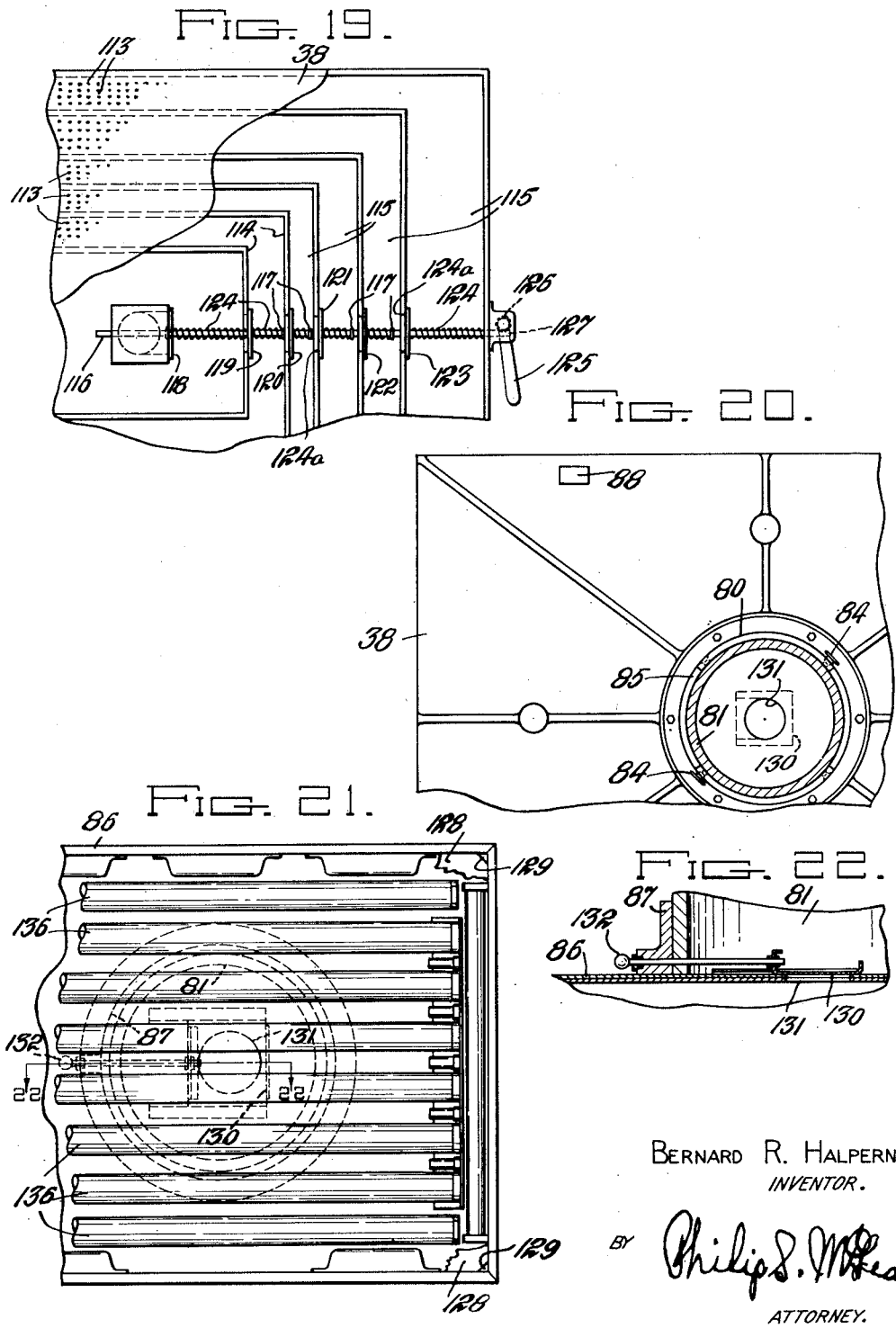

Oct. 9, 1951  B. R. HALPERN  2,570,668
PRECISION PROCESS CAMERA
Filed Dec. 13, 1947  10 Sheets-Sheet 10
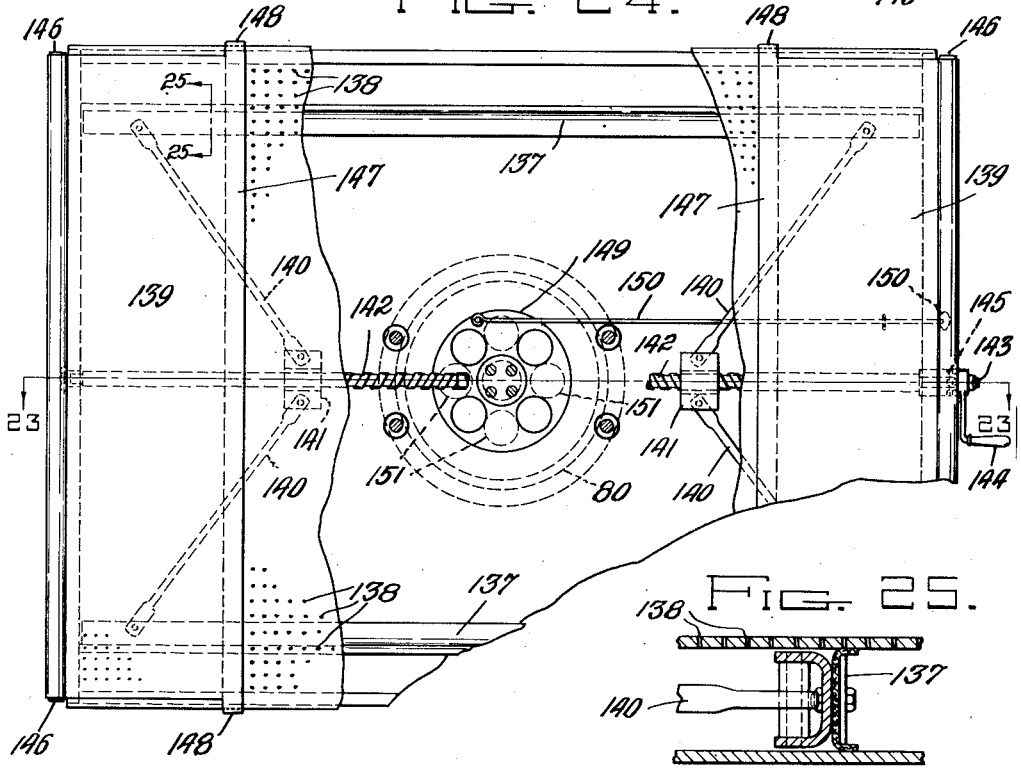
BERNARD R. HALPERN
*INVENTOR.*
BY
*ATTORNEY.*

Patented Oct. 9, 1951

2,570,668

UNITED STATES PATENT OFFICE 2,570,668

PRECISION PROCESS CAMERA

Bernard R. Halpern, New York, N. Y.

Application December 13, 1947, Serial No. 791,515

13 Claims. (Cl. 88—24)

1

The invention herein disclosed in a precision process camera, of the darkroom type, for the accurate reproduction by photography of continuous tone and line copy.

Particular objects of the invention are to provide a camera of this nature adaptable to all the many requirements and uses of such cameras that will enable the securing of maximum accuracy, fidelity of reproduction and efficiency under both normal and adverse operating conditions.

Special objects of the invention are to provide such a camera in compact, mobile, rugged form adapted for airborne transportation and meeting the military requirements for rapid assembly and disassembly and for the accurate production of line, halftone and continuous tone negatives used in the preparation of air charts, ground survey maps and the like, such design and structure to permit operation under severe field conditions where vibration and shock may be encountered.

Further special objects of the invention are to provide a camera such as outlined, embodying the features of rigidity, durability and efficiency, and to attain such characteristics and results within the range of practical, economical manufacturing simplicity.

A special object of the invention is to obtain dynamic balance and minimum truss distorting moments and for such purpose to provide practical two-point support at the center of gravity of the camera structure.

Special objects are to provide a camera of the character indicated capable of being quickly, easily and accurately set and adjusted for any and all the several operations intended to be accomplished.

An important special object of the invention is to provide a suction type holder for small or large size film or copy which will automatically grasp and securely retain such material in selected position in an optically flat, non-deforming plane without the use of a cover glass or film, perforations or grooves such as have been used in the past and which have caused optical or physical distortion of the photographic plane.

Another special object of the invention is to effect the holding of film transparencies by suction in a photographic plane interchangeable with and corresponding to the optical plane of the copyboard.

Important objects of the invention are to as-

2 sure and maintain accurate parallel movement and stability of the relatively adjustable elements of the camera such as lensboard and copyboard in respect to each other and the camera back, and to provide a single accurate parallel adjustment of the screen in the camera back.

Another object of the invention is to arrange the vacuum copy holder and the integral transparency holder in alternately usable functional relation, one in effect counterbalancing the other and so related that they may both be shifted to occupy positions non-interfering with the reduction of the camera to compact form for airborne transport or the like.

Other desirable objects and the novel features through which all purposes of the invention are attained, are set forth or will appear in the course of the following specification.

The drawings accompanying and forming part of the specification illustrate a practical commercial embodiment of the invention with certain modifications, but, as will appear in the course of the description, the actual physical structure may be modified and changed in many ways, all within the true intent and broad scope of the invention as hereinafter defined and claimed.

Fig. 1 in the drawing is a side elevation of the camera with parts in the raised, extended position for use;

Fig. 2 is a side elevation of the camera with parts in the lowered, folded or collapsed relation for shipment, handling or other purposes, and showing a cover applied, the latter broken away to show folded position of parts;

Fig. 3 is a top plan view of the camera, with parts broken away;

Fig. 4 is a broken cross sectional view on a larger scale showing in particular the tubular truss construction, the monorail rigidly carried thereby and the lensboard carriage accurately guided and positioned on the monorail, this view being taken as on substantially the plane of line 4—4 of Fig. 1;

Fig. 5 is a broken perspective detail of a modified form of tubular truss and monorail construction;

Fig. 6 is a broken part sectional perspective view of the camera back construction;

Fig. 7 is an enlarged sectional detail of one of the screen clamps on substantially the plane of line 7—7 of Fig. 6;

Fig. 8 is a broken part sectional view of the camera back end of the machine;

Fig. 9 is an enlarged broken sectional detail as on substantially the plane of line 9—9 of Fig. 8, showing in particular the porous vacuum back suction plate;

Fig. 10 is a broken top plan view of the interchangeably hinged vacuum back and ground glass screen elements;

Fig. 11 is a vertical sectional view on substantially the plane of line 11—12 of Fig. 3, on a larger scale, showing particularly details of the camera back and lensboard;

Fig. 12 is a broken part sectional face view of the ground glass screen;

Fig. 13 is an enlarged broken sectional detail of the screen rocking mechanism, taken on substantially the plane of line 13—13 of Fig. 12;

Fig. 14 is a broken detail of the ground glass;

Fig. 15 is an inside face view of the lensboard illustrating horizontal and vertical adjusting means, with parts broken and appearing in section;

Fig. 16 is a broken vertical sectional view of the elevating mechanism as appearing on substantially the plane of line 16—16 of Fig. 3;

Fig. 17 is a broken cross sectional detail view of the tubular truss and elevating screw mechanism as on substantially the plane of line 17—17 of Fig. 16;

Fig. 19 is a broken face view of the copyboard showing the zonal valve construction;

Fig. 20 is a broken sectional detail of the back portion of the copyboard, taken on substantially the plane of line 20—20 of Fig. 18;

Fig. 21 is a broken front elevation of the transparency holder, taken as on substantially the plane of line 21—21 of Fig. 18;

Fig. 22 is a broken sectional detail of one of the vacuum valves for selectively controlling the copyboard and transparency holder, in this particular instance the latter, said view being taken on substantially the plane of line 22—22 of Fig. 21;

Figs. 23 and 24 are views of an alternate form of the copyboard, Fig. 23 being a cross sectional view on substantially the plane of line 23—23 of Fig. 24, and Fig. 24 being a broken front elevation of the unit;

Fig. 25 is an enlarged broken sectional detail of one of the adjustable piston bars defining the active vertical extent of the copyboard, this view being taken on substantially the plane of line 25—25 of Fig. 24.

Figure 18:
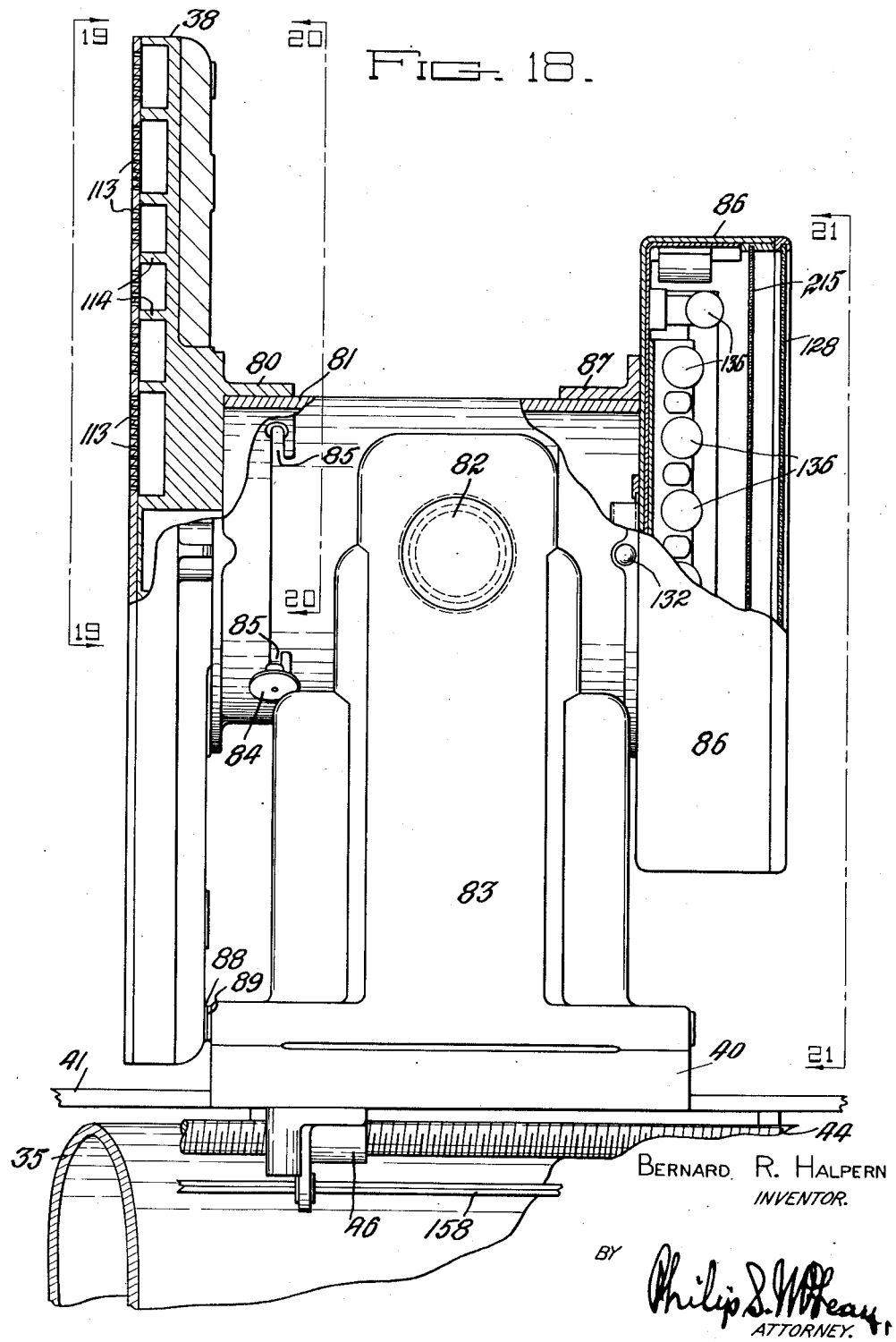
Fig. 18 is a part sectional broken view of the copyboard and transparency holder as seen on substantially the plane of line 18—18 of Fig. 3.

For purposes of mobility and portability, the base of the machine is shown constructed in the form of a sled frame having skids or runners 30. Handling is further facilitated in this particular illustration by equipping the frame with rollers 31 at the ends and 32 at the center, these rollers being carried by eccentric bearings 33 which can be rocked by lever handles 34 to lower or raise the rollers. Advantage for turning the frame in different directions is attained by arranging the eccentric bearings for the center rollers 32 to lower them below the end rollers, as indicated in Fig. 2, to permit the base to be tilted and swung around on the center rollers.

For rigidity and for maintaining the parts accurately in alignment and for combining lightness with strength, the camera back, lensboard and copyboard are carried by a large diameter, tubular truss 35. The camera back 36 is fixed on one end of this truss tube and the lensboard 37 and copyboard 38 are mounted on the carriages 39, 40, operable over a flat, wide monorail track 41, rigidly secured on saddle pieces 42, Fig. 4, on top of the tube.

Adjustments of the lensboard and copyboard carriages 39, 40, are effected, in the illustration, by screw shafts 44, 43, journaled at opposite sides, over the upper portion of the truss tube and engaging nut elements 47, 45, Figs. 1, 3 and 4, on the respective carriages. The lensboard is shown as carrying a sleeve 47a, Fig. 4, on the side opposite the nut member 47 slidingly engaging over the screw shaft 43 to act as a guide in maintaining the carriage freely slidable along the track, and the copyboard may be similarly equipped with a guide sleeve 46, Figs. 1 and 18, to ride over the other screw shaft 44.

The wide, flat, rigid monorail provides ample lateral support for the lensboard and copyboard carriages. The edges of this track are shown as beveled at 48, Fig. 4, and the carriages may be equipped with correspondingly beveled gibs 49 which can be adjusted to maintain accurate alignment and proper free sliding action of the carriages.

The screw shafts 44 and 43 for adjusting the lensboard and copyboard may be motor or hand operated.

In the present disclosure these shafts are provided with squared ends, as shown at 50, Fig. 3, so that they may be turned by a hand crank and, additionally, motors 51 and 52, Fig. 3, are provided which can be employed at will.

Figs. 8 and 11 show how these motors are connected with the screw shafts by a spiral drive gearing 53. If this drive gearing is of the reversible type the gears may be left in mesh when the screw shafts are adjusted by hand. Fig. 8, however, shows how these motors may be mounted on base plates 54, pivotally supported at 55 and secured by hand screws 56, which when loosened will permit the motors to be swung to the side to unmesh the gear drives and leave the screw shafts free to be turned by hand crank applied to the ends of the shafts.

Reduction in over-all height of the machine for air transport or other purposes, is accomplished in the present disclosure by mounting the tubular truss frame for vertical adjustment on the base through the medium of jack screws 57, 58, at opposite ends of the base.

These jack screws, as shown in Figs. 1, 8 and 16, are stepped in thrust bearings 59, 60, at their lower ends on the base and journaled at their upper ends at 61, 62, in cross channels forming parts of upright frames or stanchions 63, 64, on the opposite ends of the base.

Connection between the jack shafts and the tubular frame structure is accomplished, in the illustration, through the medium of flanges or heads 65, 66, on the opposite ends of the tubular truss, Figs. 8, 11, 16 and 17, having nuts 67, 68, at their upper ends engaging the screw threads of the jack shafts and sleeves 69, 70, at their lower ends slidingly guided over these shafts.

As shown particularly in Figs. 11, 16 and 17, the nut elements 67, 68, may be cushioned in rubber blocks indicated at 71 to absorb and prevent transmission of external vibration to the camera truss.

The upright jack screws 57, 58, are coupled to turn in unison, in the illustration, Figs. 8 and 16, by a sprocket chain 72 extending about sprocket gears 73 on the lower ends of the shafts beneath the cover 74.

The jack screw 58 at the forward end of the machine is shown as having a squared upper end 75, Figs. 1, 3, 16 and 17, so that it may be turned by a hand crank 76, Fig. 16.

For convenience, the parts may be so made that the same hand crank such as shown at 76 in Fig. 16, may be interchangeably used for operating the vertical jack shafts 57, 58, and the lensboard and copyboard adjusting screw shafts 43 and 44, or separate cranks may be provided for all or any of these shafts.

To cradle and support the tubular truss frame in the lowered position shown in Fig. 2, the base may carry a series of cradles, pillow blocks or rests 77 shaped to accommodate the tubular truss or backbone of the camera.

When lowered on the base, a cover or casing such as shown at 78 in Fig. 2, may be applied to protect the parts, the same being shown as removably secured to the base by releasable latches 79. In this particular illustration the handles 34 are left exposed when the cover 78 is in position so that the supporting rollers 31, 32, may be lowered or raised as may be required for the best handling of the machine in its transport condition.

With a large size copyboard such as shown, of greater width or lateral extent than the width of the machine, Fig. 3, this unit may be mounted so that it may be swung about its own axis and about an outside axis of support so as, in effect, to fold within the outer, allowable dimensions of the apparatus.

Thus, as shown in Figs. 1, 3 and 18, the copyboard may be made with a circular neck extension flange 80 at the back, rotatably engageable on a tubular vacuum reservoir support 81 journaled at 82 in the upstanding arms of a supporting yoke or pedestal 83 on the copyboard carriage 40.

Hand screws 84, Figs. 3 and 18, received in long bayonet slots 85 in the edge of the flange 80 permit 90° turning movement of the copyboard on the tubular vacuum reservoir support 81 and the locking of this board in position at either end of such movement. This hand screw and bayonet slot structure also permits free removal and replacement of the copyboard in respect to the tubular support.

When rotated on its axis and swung 90° from the position shown in Fig. 2, and then rocked on the tubular supporting journals 82 to carry the board into parallelism with the tubular truss, the board will come entirely within the outline of the base structure and hence not interfere with application of the cover 78.

The bodily swinging adjustment of the copyboard is facilitated in the structure here shown, by counterbalancing it with a transparency holder 86 shown as having a neck or collar flange 87 engaged over the opposite end of the tubular vacuum reservoir support 81. This transparency holder, as will be clear from Fig. 3, is of less width than the distance between the upright arms of the supporting yoke 83 so that it may swing down into position between those arms, as shown in Fig. 2.

Companion stop shoulders 88, 89, may be provided on the back of the copyboard and the carriage yoke frame 83, as shown in Fig. 18, to accurately position the copyboard in the upright, active relation.

The film, copy and transparencies of various size and shape are automatically held in different selected positions by special means, as follows:

In the camera back there is provided a smooth, flat plate 90 of porous material, such as porous stone or metal, mounted on the inner face of a frame 91 having at the outside a vacuum chest 92 connected by a flexible hose 93 with a suction blower 94 operated by motor 95, Figs. 1, 3, 8, 9, 10 and 11.

This so-called vacuum back is shown equipped with angled hinge lugs 96, 97, Fig. 8, on opposite edges of the same to cooperate with the hinge lugs or brackets 98, 99, projecting as shown in Fig. 10, from the casing of the camera back 36.

Fixed hinge pintles 100 may be provided on the hinge lugs 98, as shown in Fig. 10, so that the vacuum back can swing open, as shown in that view, and removable pins or ball detents may be provided for coupling the lugs 97 at the opposite side with the hinge brackets 99 to secure the vacuum back in the closed position.

A ground glass frame 101 is shown in Figs. 10 and 12 equipped with angled hinge lugs 102 at one edge cooperable with fixed hinge lugs 103 on the camera back, Fig. 8, and having angled lugs 104 at the opposite edge cooperable with fixed lugs 105 to hold the frame in closed relation over the end of the camera back.

In Fig. 10 it will be seen that the angled or offset hinge lugs 96 and 102 on the vacuum back and focusing frame alternately to be swung into closed position over the end of the camera back.

Further, by use of pintles at the elbows of the angled hinge lugs 96, at 108, Fig. 10, and engagement of such pintles at the centers 100, the ground glass frame 101 may be swung closed over the camera back and the vacuum back then be swung closed over the ground glass frame to close the structure for shipment or other purposes.

This closed position of the vacuum back over the ground glass frame is indicated in Figs. 1, 3, 8 and 11.

The vacuum back plate 90 may be of natural or artificial porous stone or a porous plastic or porous metal structure.

Because of the fine grain and substantially uniform porosity, a resin bonded No. 56 silicon carbide screened grain plate has been used.

The example given is merely illustrative, since a coarser or finer grain structure is practical and, in fact, the grain and pore sizes may vary both ways from the example given.

In addition to the substantially uniform suction exerted over an expended area by such a plate, there are holding advantages in the granular character of the surface. This porous surface, while molded, dressed, or otherwise treated to render it as flat and smooth as possible, nevertheless presents minute sharp points which without penetrating or injuring an overlying surface will grip and hold with a certain frictional effect, thus to some extent amplifying the suction grip.

To zone the board for different size negatives, walls or flanges 109 are shown in Figs. 8 and 9, of compressible rubber or non-resilient material pressed against the back of the porous plate and defining suction chambers 110 of gradually increasing size and which can be cut into and out of service by a rotary valve 111 on the suction chest 92 controlling bores or passages 112 leading to the successive chambers.

The copyboard 38 is shown in Figs. 18 and 19 as a flat plate having multitudinous fine perforations 113. It will be appreciated, though, that the same kind of a porous plate may be used here as used in the camera back at 90.

In back of this board are walls 114 defining successively larger vacuum chambers 115 and control of these chambers is effected by a valve rod 116 with stop shoulders 117 on it, spaced to lift in succession the valves 118 at the center and valves 119, 120, 121, 122 and 123 for the surrounding, successively larger suction chambers.

Springs 124 on the valve rod tend to hold the valve discs normally closed against their seats 124a.

The valve rod is shown as controlled by crank or handle 125 operating a pinion 126 in engagement with a rack 127 cut into the outer end of the rod.

The transparency holder 86 is enabled to hold diapositives by laying the subject over the transparent cover plate 128 of this holder and then placing an appropriate mask fitting over the face of the holder and engaging the edges of the subject so that suction will apply to the subject matter through the openings 129, Fig. 21, in the corners of the cover glass.

Suitable valve mechanism is provided for controlling suction to the copyboard and transparency holder.

Figs. 21 and 22 illustrate details of mechanism suitable for the purpose and comprising in each instance a slide valve 130 operable over a suction inlet passage 131 under the action of a push-pull handle 132. While details of this valve are shown only in connection with the transparency holder, it will be understood that similar or suitable valve control may be provided for the copyboard.

Suction for the copyboard and transparency holder is provided in the illustration by a suction blower 133 mounted on the base and driven by an electric motor 134, Figs. 1 and 3, the blower being connected with the swiveled tubular support 81 by flexible hose 135 or equivalent.

The transparency holder is shown in Figs. 18 and 21 as containing a bank of lamps 136 spaced and arranged to provide uniform internal illumination for transparencies supported by said holder.

An alternate form of variable area copyboard is shown in Figs. 23, 24 and 25, embodying parallel horizontal piston bars 137 engaging the back of the perforated plate 138 and curtains 139 closable over the face of the plate.

The vertically adjustable bars 137 determine the vertical extent and the horizontally adjustable curtains 139 determine the lateral extent of the suction area.

Adjustment of the piston bars is effected by spreader links 140 connected at their outer ends with the bars 137 and at their inner ends with nut blocks 141 engaged on reversely threaded portions 142 of a screw shaft 143 operable by hand crank 144 which can be clutched to turn the shaft at 145.

The lateral extent determining curtains 139 are shown as wrapped on rollers 146 at the side edges of the copyboard frame, and these may be of the spring winding type so that the curtains can be quickly drawn out and wound up as adjustments are made to close down or open up the size of the suction area.

Stiff bars 147 are shown at the edges of the curtains having clips or loops 148 at the ends of the same engaged over the upper and lower edges of the perforated plate to hold the curtains closely in place.

The valve mechanism for controlling the suction is shown in this case as a rotatively mounted valve disc 149 operable by a push-pull handle 150 to open and close suction ports 151 in the hub portion of the unit, back of the perforated plate.

In addition to adjustments of the lensboard and copyboard described, other necessary or desirable adjustments of the parts can be effected at the camera back end of the apparatus, as follows:

Horizontal and vertical adjustments of the lens mount can be effected by operating the hand cranks 152, 153, Fig. 8, on the back of the panel or flange extension 154 at this end of the truss tube 35.

These cranks, through universal jointed shafting 155, 156, Figs. 3 and 11, turn the square shafts 157, 158, extending along, above and at opposite sides of the tubular truss.

The lens carriage 39, as shown in Fig. 4, carries upright shafts 159, 160, provided with spiral gears 161, 162, at their lower ends in mesh with spiral drive gears 163, 164, slidingly sleeved on the square shafts 157, 158, so as to travel along with the carriage.

The upright shaft 159, as shown in Fig. 15, carries a long pinion 165 in mesh with a horizontal rack 166 on the lens mount board 167.

The latter, as shown in Figs. 11 and 15, is mounted to slide horizontally in a frame 168 retained by guides 169 for vertical sliding movement in the support 170.

The vertical shaft 160 is shown in Figs. 11 and 15 as having a screw threaded connection with the frame 168 at 171 so that rotary adjustments of this shaft will effect vertical movements of the frame carrying the laterally movable lens mount.

The lateral and vertical adjustments of the lens mount can thus be accomplished one without interfering with or affecting the other.

Parallel adjustments of the halftone screen 172, Figs. 6 and 11, in respect to the vacuum back panel 90, are accomplished in the illustration by means of a hand crank 173 adapted to be coupled at 174 with a bevel gear 175 in mesh with a corresponding bevel gear 176 on the lower end of a screw shaft 177. This shaft has a screw engagement at 178 with a frame 179 guided for vertical adjustment in the casing of the camera back 36.

As shown particularly in Fig. 6, the vertically adjustable frame 179 has angularly projecting flanges 180 reaching around the sides of a fore-and-aft adjustment frame 181, these flanges carrying rotatably supported slide blocks 182 received in inclined slots 183 in the opposing side walls of the screen carrying frame 181.

The halftone screen 172 is shown in Fig. 6 supported between upper and lower bars 184, 185, adjustably secured by shoes 186 over vertical side flanges 187 of the screen frame. This construction allows for quick substitution of different size screens.

The screens are shown as held in place on the vertically adjustable rails 184, 185, by rotary helical clamps 188, Fig. 7, having helical grooves 189 to receive the edges of the screen and adapted to be turned by finger flanges 190 to seat the screen firmly and evenly against the front ledge of 188.

The helical cam grooves 189 are open at one point, as shown at 191, to accept the edges of the screen, after which the cams may be turned to clamp the screen in place.

As shown in Fig. 7, the cam buttons 188 may be yieldingly supported by being mounted to turn on blocks 192 seated in cavities 193 in the supporting rails 184, 185, and adjustably held therein by screws 194 against the tension of springs 195. The cam supporting bearing blocks 192 are shown as held against turning by stationary screws 196 projecting into slots 197 in the bearings so that turning of the adjusting screws 194 will locate the cam buttons in proper position to yieldingly retain the screen in correct alignment with the vacuum back.

The focusing screen is illustrated in detail at 198, Figs. 12 and 14, as lined in small cross squares 199, by which size of image can be accurately judged and adjusted for.

To bring this accurately lined screen into register with the object, this screen may be mounted for rotational adjustment about the center by providing it with rounded corner bearings 200 in sliding engagement with correspondingly curved bearings 201 in the frame 101. The curved bearing surfaces 200, 201, may be formed on arcs struck from the center of the screen at 202 and adjustment about this center may be accomplished by means of a hand knob 203, Fig. 13, journaled in the lower rail of the frame 101 and carrying a pinion 204 in mesh with a rack 205 on the lower edge of the inner frame 206, to which the ground glass focusing screen 198 is directly attached.

Fig. 5 is a fragmentary and diagrammatic view illustrating a somewhat modified but possibly more rigid form of the tubular truss and monorail construction, showing the monorail 207 formed as a single piece of sheet metal having its edges bent down convergently at 208 and edge welded or otherwise secured at 209 over the upper portion of the truss tube 210. The bearing surfaces later being trued up for a light machine fit for the carriages.

The monorail track 41, Fig. 4, and 207, Fig. 5, being directly attached to the truss tube, is given the rigidity of the tubular structure and, in turn, adds re-enforcement to the tubular beam or "backbone." This arrangement, with the monorail on top of the tube and the adjusting shafts extending along the top of the tube, beneath opposite sides of the monorail, presents a compact, "clean" structure free of protuberances and clear about the underside to leave space for other items and to assure seating properly in the lower supports or pillow blocks 77. The screw shafts and the squared shafts as well, may be journaled on the truss or on the end flanges or headers carried by the truss. The tubular truss being of substantial dimensions, may, if desired, be utilized as a reservoir for the suction blowers.

Various scales and indicators may be utilized to show position of parts and aid in their proper adjustment. For one example, the vertically sliding frame 180, Fig. 6, may carry an indicator 211 to register with a stationary scale 212 for indicating screen distance of the halftone screen 172.

Another scale mounted on the monorail with indicating verniers attached to the lens and copyboard carriages may be used for predetermining focusing positions of these elements, or counters may be installed geared to the drive shafts to provide direct readings of the copyboard and lensboard positions.

The lenses used in the camera, such as indicated at 213, Figs. 3, 11 and 15, may be mounted on bases 214 interchangeably engageable with a bayonet joint form of connection with the shiftable lens supporting frame 167.

For diffusion purposes the transparency holder 86 may be constructed as indicated in Fig. 18, with an opal glass 215 at the inside of the outer ground glass cover 128. This provides double diffusion for uniformity of light. Also, to overcome the fading off effect about the edges and thus afford greater uniformity of light, the lamps 136 which are nearer the edges may be located closer to the back of the opal glass 215, substantially as indicated at the top in Fig. 18.

What is claimed is:

1. A camera of the character disclosed comprising a skid frame, supporting rollers mounted for raising and lowering movements on said skid frame and a camera frame mounted for raising and lowering movements on said skid frame, said supporting rollers including rollers located at opposite ends and at a central portion of the skid frame, said last mentioned rollers being capable of positioning below the end rollers to enable turning of the sled frame thereon.

2. A portable camera of the character disclosed comprising a base structure, a tubular truss, means for effecting raising and lowering of said tubular truss on said base structure, a track carried by said tubular truss, a carriage mounted for travel on said track, a copyboard mounted on said carriage and pivoted to swing from a vertical to a substantially horizontal position and a transparency holder connected in counter-balancing relation to said copyboard to swing in reverse direction from said copyboard and of smaller over-all dimensions than the copyboard to occupy less space so as to permit lowering of the same as the copyboard is swung upwardly into the horizontal position stated, said carriage having a yoke with spaced upstanding arms and the copyboard and transparency holder being mounted on the opposite ends of a supporting member pivoted transversely on the upstanding arms of the yoke and said arms being spaced a greater distance apart than the dimensions of said transparency holder so that the transparency holder may swing into position between said spaced arms to effect reduction in the space occupied by said camera parts when the tubular truss is lowered, in folding the camera for shipment.

3. A camera of the character disclosed comprising a track, a carriage mounted for travel on said track and having a yoke with spaced upstanding arms, a tubular member journaled on a transverse axis between the arms of said yoke, a transparency holder mounted transversely on one end of said tubular member and of external dimensions small enough to swing with the pivoting of the tubular member into position between the upstanding arms of said yoke and a copyboard of larger dimensions than said transparency holder and transversely mounted on the opposite end of said tubular member and whereby as said tubular member is swung on its axis to lower the transparency holder into position between the arms of the yoke, the copyboard on the opposite end of said tubular member will be swung upwardly into position over the yoke.

4. A camera of the character disclosed comprising a track, a carriage mounted for travel on said track and having a yoke with spaced upstanding arms, a tubular member journaled between the arms of said yoke, a transparency holder mounted on one end of said tubular member and of external dimensions small enough to swing into position between the upstanding arms of said yoke, a copyboard mounted on the opposite end of said tubular member, means for applying suction to the interior of said tubular member and valve means controlling application of suction to either said transparency holder or said copyboard.

5. A camera of the character disclosed comprising a track, a carriage mounted for travel on said track and having a yoke with spaced upstanding arms, a tubular member journaled between the arms of said yoke, a transparency holder mounted on one end of said tubular member and of external dimensions small enough to swing into position between the upstanding arms of said yoke, a copyboard mounted on the opposite end of said tubular member, means for applying suction to the interior of said tubular member and valve means controlling application of suction to either said transparency holder or said copyboard, said copyboard being rotatably engaged on said tubular member and arranged for 90° rotational adjustment thereon.

6. A camera of the character disclosed comprising a tubular truss, vertical jack screws engaged with opposite ends of said truss, means for effecting substantially simultaneous adjustments of said jack screws, a track rigidly mounted on said tubular truss and a lensboard and copyboard independently adjustable on said track, said means for effecting substantially simultaneous adjustment of said jack screws including a hand crank engageable with the upper end of one of said jack screws and gearing connecting the lower ends of the jack screws.

7. A camera of the character disclosed comprising a tubular truss, frames on the opposite ends of said tubular truss, nut blocks cushioned in the upper ends of said frames, guide sleeves in the lower ends of said frames, vertical jack screws extending up through said guide sleeves and engaged with said cushioned nut blocks, means for effecting substantially simultaneous adjustment of said jack screws, a track rigidly mounted on said tubular truss between said end frames and a lensboard and a copyboard independently adjustable on said track.

8. A camera of the character disclosed comprising a rigid tubular truss, a monorail track rigidly mounted on top of said truss, screw shafts journaled at opposite sides of said truss, shafts of angular cross section journaled at opposite sides of the truss, a lensboard carriage mounted on said track and having a nut element engaged with one screw shaft, a copyboard carriage mounted on said track and having a nut element engaged with the other screw shaft, a lens mount vertically and horizontally adjustable on said lensboard carriage, upright shafts on said lensboard carriage for effecting vertical and horizontal adjustments of said lens mount, spiral gears on the lower ends of said upright shafts, companion spiral gears meshing therewith and slidingly engaged on said angular cross section shafts for travel with the lensboard carriage and means for effecting independent adjustment of said screw shafts and angular cross section shafts.

9. The portable precision process camera herein disclosed comprising a portable sled base, upright standards on opposite ends of said base, vertical jack screws journaled in said standards and geared to operate together, a large diameter tubular truss suspended between said standards and having heads at opposite ends of the same provided at the top with nuts hung on the upper ends of said jack screws and at the bottom with sleeves slidingly guided over said jack screws, a track rigidly mounted directly on the top of said tubular truss, a camera back mounted at one end of said tubular truss, lensboard and copyboard carriages mounted for travel on the track in respect to said camera back and arranged to lower with the truss between said upright standards and means for simultaneously operating said jack screws to effect lifting of the tubular truss and track to carry said camera parts to a position above the upright standards and to lower said tubular truss to lower the camera parts into position between said upright standards.

10. The portable precision process camera herein disclosed comprising a portable sled base, upright standards on opposite ends of said base, vertical jack screws journaled in said standards and geared to operate together, a large diameter tubular truss suspended between said standards and having heads at opposite ends of the same provided at the top with nuts hung on the upper ends of said jack screws and at the bottom with sleeves slidingly guided over said jack screws, a track rigidly mounted directly on the top of said tubular truss, a camera back mounted at one end of said tubular truss, lensboard and copyboard carriages mounted for travel on the track in respect to said camera back and arranged to lower with the truss between said upright standards, means for simultaneously operating said jack screws to effect lifting of the tubular truss and track to carry said camera parts to a position above the upright standards and to lower said tubular truss to lower the camera parts into position between said upright standards and a hollow cover of approximately the length and width of said sled base and of approximately the height of said upright standards to thereby fit down over the upright standards onto said base when said tubular truss and parts supported thereby is lowered as described.

11. The portable precision process camera herein disclosed comprising a portable sled base, upright standards on opposite ends of said base, vertical jack screws journaled in said standards and geared to operate together, a large diameter tubular truss suspended between said standards and having heads at opposite ends of the same provided at the top with nuts hung on the upper ends of said jack screws and at the bottom with sleeves slidingly guided over said jack screws, a track rigidly mounted directly on the top of said tubular truss, a camera back mounted at one end of said tubular truss, lensboard and copyboard carriages mounted for travel on the track in respect to said camera back and arranged to lower with the truss between said upright standards and means for simultaneously operating said jack screws to effect lifting of the tubular truss and track to carry said camera parts to a position above the upright standards and to lower said tubular truss to lower the camera parts into position between said upright standards, a large size copyboard having one dimension of greater extent than the width of said base and means pivotally supporting said copyboard on said copyboard carriage for enabling the swinging of said copyboard into position with said greatest dimension longitudinally in line with the base to bring the dimensions of the copyboard, when lowered, within the dimensions of said base.

12. The portable precision process camera herein disclosed comprising a portable sled base, upright standards on opposite ends of said base, vertical jack screws journaled in said standards and geared to operate together, a large diameter tubular truss suspended between said standards and having heads at opposite ends of the same provided at the top with nuts hung on the upper ends of said jack screws and at the bottom with sleeves slidingly guided over said jack screws, a track rigidly mounted directly on the top of said tubular truss, a camera back mounted at one end of said tubular truss, lensboard and copyboard carriages mounted for travel on the track in respect to said camera back and arranged to lower with the truss between said upright standards, means for simultaneously operating said jack screws to effect lifting of the tubular truss and track to carry said camera parts to a position above the upright standards and to lower said tubular truss to lower the camera parts into position between said upright standards, a copyboard having a circular neck extension at the back of the same, a tubular support journaled on a transverse axis on said copyboard carriage and said circular neck extension being pivotally engaged with one end of said tubular support for enabling said copyboard to be swung into different angular relations on the end of said tubular support.

13. The portable precision process camera herein disclosed comprising a portable sled base, upright standards on opposite ends of said base, vertical jack screws journaled in said standards and geared to operate together, a large diameter tubular truss suspended between said standards and having heads at opposite ends of the same provided at the top with nuts hung on the upper ends of said jack screws and at the bottom with sleeves slidingly guided over said jack screws, a track rigidly mounted directly on the top of said tubular truss, a camera back mounted at one end of said tubular truss, lensboard and copyboard carriages mounted for travel on the track in respect to said camera back and arranged to lower with the truss between said upright standards, means for simultaneously operating said jack screws to effect lifting of the tubular truss and track to carry said camera parts to a position above the upright standards and to lower said tubular truss to lower the camera parts into position between said upright standards, a copyboard having a circular neck extension at the back of the same, a tubular support journaled on a transverse axis on said copyboard carriage and said circular neck extension being pivotally engaged with one end of said tubular support for enabling said copyboard to be swung into different angular relations on the end of said tubular support, said tubular support being of large diameter to form a vacuum reservoir, a tubular journal pivotally mounting said vacuum reservoir tubular support, said copyboard having a porous back exposed to said vacuum reservoir, and a vacuum applying connection to said tubular journal.

BERNARD R. HALPERN.

REFERENCES CITED

The following references are of record in the file of this patent:

UNITED STATES PATENTS

| Number | Name | Date |
|---|---|---|
| 265,980 | Pearsall | Oct. 17, 1882 |
| 403,476 | Kuhn | May 14, 1889 |
| 503,518 | Bauer | Aug. 15, 1893 |
| 798,353 | Levy | Aug. 29, 1905 |
| 904,913 | Hatt | Nov. 24, 1908 |
| 1,195,225 | Huebner | Aug. 22, 1916 |
| 1,347,824 | Pifer | July 27, 1920 |
| 1,438,790 | Schwanhausser | Dec. 12, 1922 |
| 1,535,225 | Hays | Apr. 28, 1925 |
| 1,805,202 | Boedicker | May 12, 1931 |
| 1,813,689 | Weisker | July 7, 1931 |
| 1,813,690 | Weisker | July 7, 1931 |
| 1,892,683 | Robertson | Jan. 3, 1933 |
| 1,945,481 | Dilkes | Jan. 30, 1934 |
| 2,012,628 | Howell | Aug. 27, 1935 |
| 2,078,741 | Stenmark | Apr. 27, 1937 |
| 2,150,974 | Huebner | Mar. 21, 1939 |
| 2,306,885 | Klemm | Dec. 29, 1942 |
| 2,352,221 | Phillips | June 27, 1944 |
| 2,364,363 | Howell | Dec. 5, 1944 |
| 2,376,416 | Campbell | May 22, 1945 |
| 2,379,279 | Costello | June 26, 1945 |
| 2,406,770 | Huebner | Sept. 3, 1946 |

FOREIGN PATENTS

| Number | Country | Date |
|---|---|---|
| 399,408 | Germany | July 22, 1924 |
| 463,927 | Germany | Aug. 8, 1928 |
| 495,501 | Germany | Apr. 7, 1930 |